(12) United States Patent
Li

(10) Patent No.: US 10,081,549 B2
(45) Date of Patent: Sep. 25, 2018

(54) METHOD AND SYNTHESIS REACTOR FOR PRODUCING CARBON NANOTUBES

(71) Applicant: SHANDONG DAZHAN NANOMATERIALS CO., LTD., Binzhou (CN)

(72) Inventor: Yan Li, Zibo (CN)

(73) Assignee: SHANDONG DAZHAN NANOMATERIALS CO., LTD., Binzhou (CN)

( * ) Notice: Subject to any disclaimer, the term of this patent is extended or adjusted under 35 U.S.C. 154(b) by 193 days.

(21) Appl. No.: 15/012,806

(22) Filed: Feb. 1, 2016

(65) Prior Publication Data
US 2016/0152476 A1    Jun. 2, 2016

Related U.S. Application Data

(63) Continuation-in-part of application No. PCT/CN2013/001259, filed on Oct. 16, 2013.

(30) Foreign Application Priority Data

Aug. 8, 2013 (CN) .......................... 2013 1 0343451

(51) Int. Cl.
   *C01B 32/00* (2017.01)
   *C01B 32/162* (2017.01)
   (Continued)

(52) U.S. Cl.
   CPC ............ *C01B 32/162* (2017.08); *B01J 8/003* (2013.01); *B01J 8/007* (2013.01); *B01J 8/0025* (2013.01);
   (Continued)

(58) Field of Classification Search
   CPC ........ C01B 32/16; C01B 32/162; B01J 8/007; B01J 8/1863; B01J 8/228; B01J 8/0025;
   (Continued)

(56) References Cited

U.S. PATENT DOCUMENTS 7,563,427 B2 * 7/2009 Wei .................. B01J 8/0055
                                                 423/447.1

OTHER PUBLICATIONS

Dunens, Oscar M., Kieran J. MacKenzie, and Andrew T. Harris. "Synthesis of multi-walled carbon nanotubes on 'red mud' catalysts." Carbon 48.8 (2010): 2375-2377. (Year: 2010).*

(Continued)

*Primary Examiner* — Richard M Rump
(74) *Attorney, Agent, or Firm* — Matthias Scholl P.C.; Matthias Scholl

(57) ABSTRACT

A synthesis reactor for producing carbon nanotubes. The reactor includes a main reactor, a feeder, a settler, an air inlet device, and a product outlet. The main reactor communicates with the settler in the form of a communicating vessel. The feeder communicates with the settler via a catalyst inlet. The air inlet device is disposed under the settler. The wall of the main reactor is provided with a heat exchanger. The product outlet is disposed at the lower part of the main reactor. A method for producing a carbon nanotube, includes: 1) drying red mud for 1 to 4 hour(s) at the temperature of between 101° C. and 109° C.; 2) smashing and sieving the red mud through a 200-mesh sieve to yield a catalyst; and 3) adding the catalyst to a synthesis reactor.

7 Claims, 2 Drawing Sheets

(51) Int. Cl.
*B01J 23/745* (2006.01)
*B01J 8/18* (2006.01)
*B01J 8/22* (2006.01)
*B01J 8/00* (2006.01)
*C01B 32/16* (2017.01)

(52) U.S. Cl.
CPC ............ *B01J 8/1863* (2013.01); *B01J 8/228* (2013.01); *B01J 23/745* (2013.01); *C01B 32/16* (2017.08); *B01J 2208/00168* (2013.01); *B01J 2208/00752* (2013.01)

(58) Field of Classification Search
CPC ... B01J 8/003; B01J 8/1818; B01J 8/24; B01J 23/745; B01J 2208/00168; B01J 2208/00752
See application file for complete search history.

(56) References Cited

OTHER PUBLICATIONS

Hsieh, Chien-Te, et al. "Parameter setting on growth of carbon nanotubes over transition metal/alumina catalysts in a fluidized bed reactor." Powder Technology 192.1 (2009): 16-22.*

* cited by examiner

METHOD AND SYNTHESIS REACTOR FOR PRODUCING CARBON NANOTUBES

CROSS-REFERENCE TO RELATED APPLICATIONS

This application is a continuation-in-part of International Patent Application No. PCT/CN2013/001259 with an international filing date of Oct. 16, 2013, designating the United States, now pending, and further claims priority benefits to Chinese Patent Application No. 201310343451.0 filed Aug. 8, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a method and a synthesis reactor for producing carbon nanotubes.

Description of the Related Art

Conventional catalysts for producing carbon nanotubes are expensive and not very efficient.

SUMMARY OF THE INVENTION

In view of the above-described problems, it is one objective of the invention to provide a method and a synthesis reactor for continuous production of carbon nanotubes using red mud as a catalyst. The red mud is dried and smashed to use as a catalyst, thus saving the production cost. The synthesis reactor allows a carbon source comprising a hydrocarbon, the catalyst, and a reaction mixture of partly-reacted carbon source and catalyst to circulate, thus achieving a circular catalytic reaction and improving the utilization rate of the catalyst. The carbon nanotubes feature a high purity and high yield. The synthesis reactor features a simple structure and convenient operation.

To achieve the above objective, in accordance with one embodiment of the invention, there is provided a method for producing a carbon nanotube, the method comprising the following steps: drying red mud for 1 to 4 hour(s) at a temperature of between 101° C. and 109° C.; smashing and sieving the red mud through a 200-mesh sieve to yield a catalyst, and adding the catalyst to a synthesis reactor.

In a class of this embodiment, red mud is a waste product generated in the industrial production of aluminum, and contains a large amount of oxides of iron, aluminum, and calcium.

In a class of this embodiment, the red mud is a waste product generated in an industrial production of aluminum through Bayer process; a mass percentage of total iron in the red mud is more than 20%. The maximum mass percentage of iron in the red mud is 50%.

In class of this embodiment, the method comprises: introducing N2 to the synthesis reactor prior to reaction; adding the catalyst to the synthesis reactor; heating the synthesis reactor to a temperature of between 600 and 1000° C.; and introducing a mixed gas of N2 and a carbon source comprising a hydrocarbon having less than 7 carbon atoms into the synthesis reactor.

In a class of this embodiment, the method comprises the following steps:

1) drying the red mud for 1 to 4 hour(s) at the temperature of between 101° C. and 109° C.; smashing and sieving the red mud by the 200-mesh sieve to yield the catalyst;
2) introducing N2 into the synthesis reactor for 20 to 60 minutes prior to reaction, and adding the catalyst via a catalyst inlet to a bottom of an air inlet device; heating a fluidized bed of a main reactor to a temperature of between 600 and 1000° C., and introducing a mixed gas of N2 and a carbon source comprising a hydrocarbon having less than 7 carbon atoms via the air inlet device into the main reactor, where the catalyst is carried by the mixed gas and enters the main reactor;
3) allowing the carbon source comprising the hydrocarbon to attach to a surface of the catalyst and thus the hydrocarbon is cracked to yield carbon nanotubes; discharging the carbon nanotubes from a product outlet on a bottom of the fluidized bed;
4) allowing a mixture comprising residue gases and the catalyst to be driven and settle in a settler, and insufflating the mixture into the main reactor by a fresh mixed gas of N2 and the carbon source comprising the hydrocarbon, thus achieving a circular catalytic reaction; and
5) discharging waste gas from a waste gas outlet disposed on one side wall of the settler.

In a class of this embodiment, a volume ratio of nitrogen to the carbon source comprising the hydrocarbon in the mixed gas is between 1:0.5 and 1:1.

In a class of this embodiment, a flow rate of the mixed gas is between 0.2 and 0.5 m/s.

In a class of this embodiment, the phase composition of the red mud is: sodalite-type hydrous sodium aluminosilicate ($NaO_2 \cdot Al_2O_3 \cdot 1.7SiO_2 \cdot 4H_2O$), goethite (FeOOH), hematite ($Fe_2O_3$), quartz ($SiO_2$), in addition to $Al_2O_3$, $NaO_2$, and CaO, etc. The mass percentage of the total iron is more than 20%, and $Fe_2O_3$ is a major component of the red mud, accounting for 90% of the total iron. Meanwhile, minerals exist in the red mud in the form of mineral cementations of Fe, Al, and Si, which feature fine crystal grains and incomplete crystallization; thus by reducing roasting at a temperature of between 600 and 1000° C., the crystals are restructured to form a catalyst for catalytic cracking of carbon source to produce the carbon nanotubes.

The invention also provides a synthesis reactor comprising a main reactor, a feeder, a settler, an air inlet device, and a product outlet. The main reactor communicates with the settler in the form of a communicating vessel. The feeder communicates with the settler via a catalyst inlet. The air inlet device is disposed under the settler. A wall of the main reactor is provided with a heat exchanger. The product outlet is disposed at a lower part of the main reactor.

In a class of this embodiment, the main reactor is combined with the settler to form a hollow square structure. The main reactor is a fluidized bed. One side wall of the settler is provided with a waste gas outlet, and the waste gas outlet is disposed above the catalyst inlet.

According to different requirements, the synthesis reactor for carbon nanotube production is also suitable for producing fiber, hydrogen, or other nanomaterials.

In a class of this embodiment, the red mud (mass percentage of iron is more than 20%) is smashed, dried and brought into the main reactor along the gas. Due to the catalytic effect of metal grains of the red mud and the template effect of a carrier, the carbon source comprising the hydrocarbon in the main reactor is attached to the carrier through chemical vapor deposition and is gradually cracked to yield the carbon nanotubes. Diameters of the carbon nanotubes are between 4 and 20 nm and lengths thereof are between 0.5 and 20 μm. The carbon nanotubes are disposed on a lower part of the main reactor. Unreacted carbon source is able to reenter the main reactor via the settler, thus a circular catalytic reaction is realized, and the catalytic efficiency is improved. Reaction velocity is controllable by controlling the gas flow rate. The synthesis reactor features a simple structure, convenient operation, and is suitable for continuous industrial production.

Compared with existing technologies, advantages of the method and the synthesis reactor for continuous production of carbon nanotubes are as follows:

1. The method employs the red mud as the catalyst, thus saving the production cost and consuming the red mud, for example, to produce 1000 tons of carbon nanotubes, 200 to 300 tons of red mud is consumed.
2. The synthesis reactor employs a fluidized bed as the main reactor, and thus has compact structure and good practicability.
3. The circular catalytic reaction of the method improves the catalytic efficiency and saves the raw materials.
4. The catalyst and the raw material can be added and discharged continuously, thus achieving a continuous production on a large scale.
5. The synthesis reactor comprises a heat exchanger and thus is able to dissipate heat or supply heat, so it is practicable in the catalytic cracking process which is either exothermic or endothermic.

Figure 1:
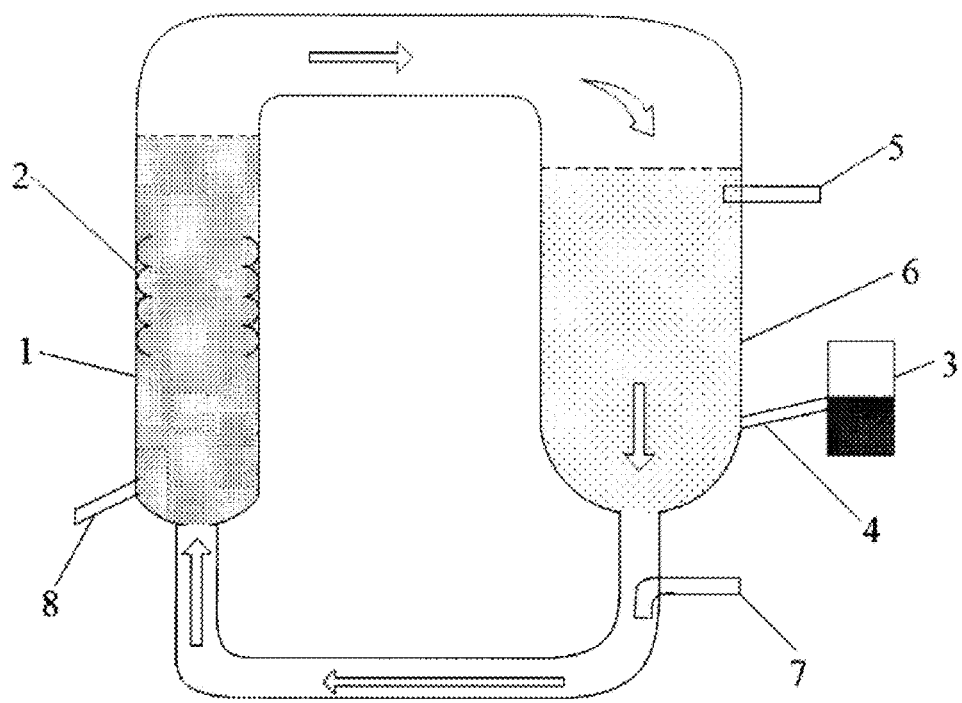
FIG. 1 is a schematic diagram of a synthesis reactor for producing carbon nanotubes in accordance with one embodiment of the invention.

In the figures, the following reference numbers are used: 1. Main reactor; 2. Heat exchanger; 3. Feeder; 4. Catalyst inlet; 5. Waste gas outlet; 6. Settler; 7. Air inlet device; and 8. Product outlet.

DETAILED DESCRIPTION OF THE EMBODIMENTS

For further illustrating the invention, experiments detailing a method and a synthesis reactor for carbon nanotube production are described below. It should be noted that the following examples are intended to describe and not to limit the invention.

A synthesis reactor comprises a main reactor 1, a feeder 3, a settler 6, an air inlet device 7, and a product outlet 8. The main reactor 1 communicates with the settler 6 in the form of a communicating vessel. The feeder 3 communicates with the settler 6 via a catalyst inlet 4. The air inlet device 7 is disposed under the settler 6. A wall of the main reactor 1 is provided with a heat exchanger 2. The product outlet 8 is disposed at a lower part of the main reactor 1.

The main reactor 1 is combined with the settler 6 to form a hollow square structure. The main reactor 1 is a fluidized bed.

One side wall of the settler 6 is provided with a waste gas outlet 5, and the waste gas outlet 5 is disposed above the catalyst inlet 4.

Example 1

The red mud used in the example is a waste product generated in the industrial production by bayer process of aluminum. A mass percentage of the total iron in the red mud is 25.21%

The red mud was dried for 2 hours at 105° C.; then the red mud was smashed and sieved by a 200-mesh sieve to yield a catalyst.

Figure 2:
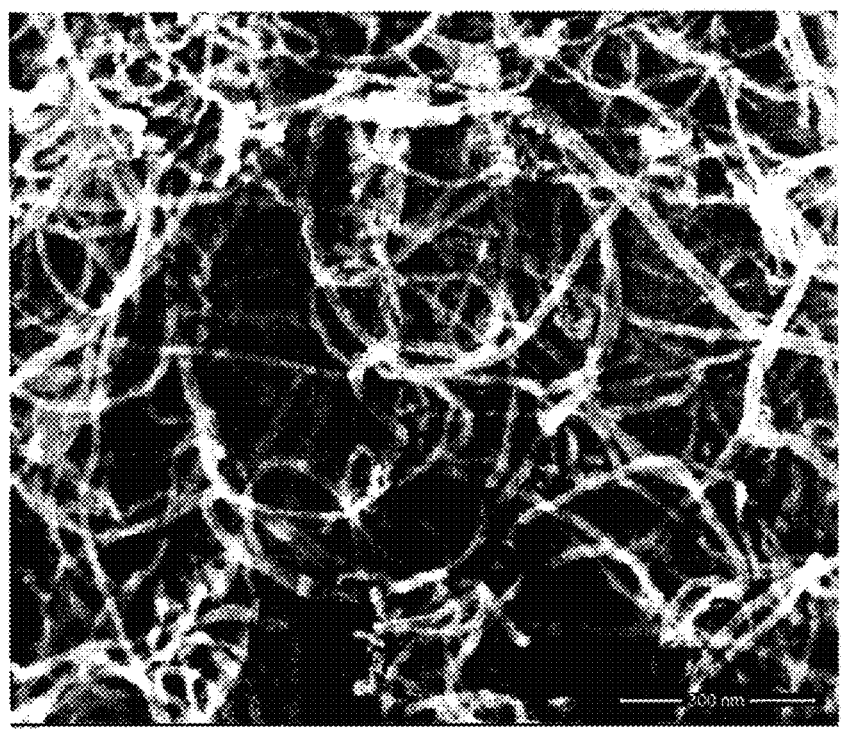
FIG. 2 is an electron microscope image of nanotubes produced by a method and a synthesis reactor for producing carbon nanotubes in Example 1.

N2 was introduced from the air inlet device 7 for 30 minutes before the reaction. 20 g of the catalyst was added into the feeder 3, and was introduced into the synthesis reactor from the catalyst inlet 4. A fluidized bed of the main reactor was heated to 700° C., and a mixed gas of propylene and nitrogen was introduced into the main reactor; the catalyst was insufflated into the main reactor 1 by the mixed gas to yield the carbon nanotubes. A ratio of nitrogen to propylene in the mixed gas is 1:0.5. A flow rate of the mixed gas is 0.3 m/s. The reaction lasted for an hour and produced 75 g of carbon nanotubes which were shown in FIG. 2.

Example 2

The red mud used in the example is a waste product generated in the industrial production by bayer process of aluminum. A mass percentage of the total iron in the red mud is 36.69%

The red mud was dried for 4 hours at 102° C.; then the red mud was smashed to yield a catalyst.

Figure 3:
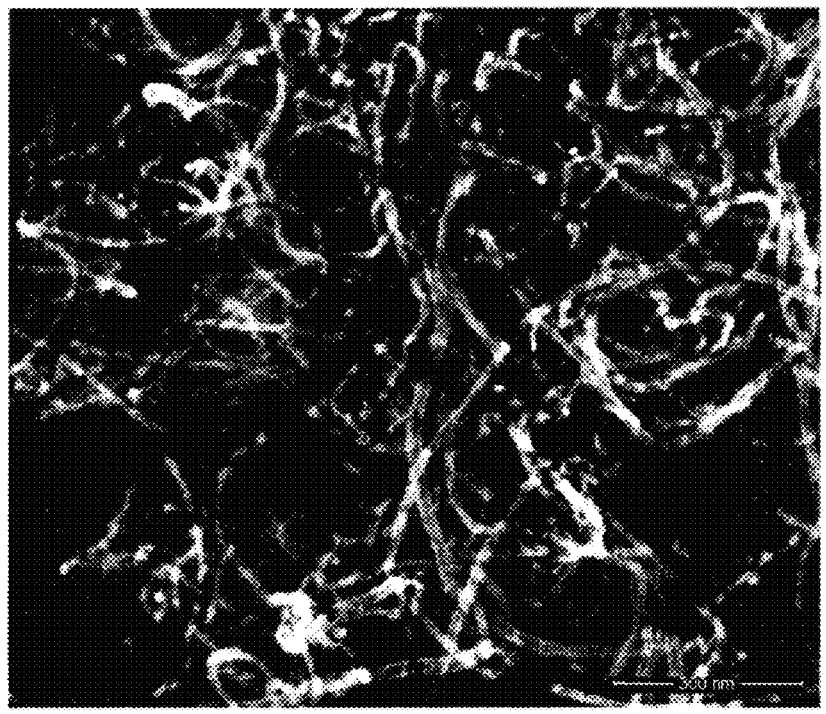
FIG. 3 is an electron microscope image of nanotubes produced by a method and a synthesis reactor for producing carbon nanotubes in Example 2.

N2 was introduced from the air inlet device 7 for 20 minutes before the reaction. 20 g of the catalyst was added into the feeder 3, and was introduced into the synthesis reactor from the catalyst inlet 4. A fluidized bed of the main reactor was heated to 900° C., and a mixed gas of methane and nitrogen was introduced into the main reactor; the catalyst was insufflated into the main reactor 1 by the mixed gas to yield the carbon nanotubes. A ratio of nitrogen to methane in the mixed gas is 1:0.8. A flow rate of the mixed gas is 0.5 m/s. The reaction lasted for an hour and produced 91 g of carbon nanotubes which were shown in FIG. 3.

Example 3

The red mud used in the example is a waste product generated in the industrial production by bayer process of aluminum. A mass percentage of the total iron in the red mud is 44.71%

The red mud was dried for 1.5 hours at 109° C.; then the red mud was smashed to yield a catalyst.

Figure 4:
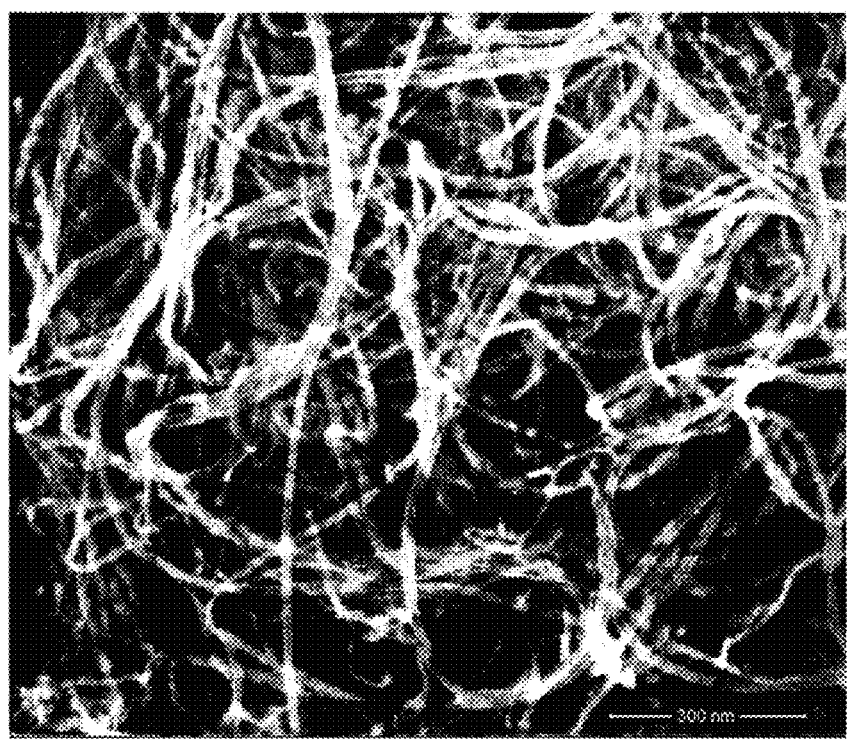
FIG. 4 is an electron microscope image of nanotubes produced by a method and a synthesis reactor for producing carbon nanotubes in Example 3.

N2 was introduced from the air inlet device 7 for 60 minutes before the reaction. 20 g of the catalyst was added into the feeder 3, and was introduced into the synthesis reactor from the catalyst inlet 4. A fluidized bed of the main reactor was heated to 850° C., and a mixed gas of ethylene and nitrogen was introduced into the main reactor; the catalyst was insufflated into the main reactor 1 by the mixed gas to yield the carbon nanotubes. A ratio of nitrogen to ethylene in the mixed gas is 1:0.6. A flow rate of the mixed gas is 0.4 m/s. The reaction lasted for an hour and produced 103 g of carbon nanotubes which were shown in FIG. 4.

According to different requirements, the synthesis reactor for carbon nanotube production is also suitable for producing fiber, hydrogen, or other nanomaterials.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for producing carbon nanotubes by utilizing a synthesis reactor, the reactor comprising a main reactor and a settler, wherein the main reactor is connected to the settler via communicating vessels to form a hollow square structure; the method comprising:
   1) collecting red mud, and drying the red mud for 1 to 4 hour(s) at a temperature of between 101° C. and 109° C.;
   2) smashing and sieving the red mud through a 200-mesh sieve to yield a catalyst;
   3) adding the catalyst to the synthesis reactor via a catalyst inlet disposed on the settler;
   4) heating the main reactor to a temperature of between 600 and 1000° C.;
   5) adding a mixed gas of nitrogen and a carbon source comprising a hydrocarbon having less than 7 carbon atoms into the synthesis reactor via an air inlet device disposed under the settler, whereby the catalyst is carried by the mixed gas to the main reactor;
   6) discharging the carbon nanotubes through a product outlet disposed at a lower part of the main reactor;
   7) allowing a mixture comprising residual gases and the catalyst to flow from the main reactor to the settler, and insufflating the mixture into the main reactor by utilizing the mixed gas; and
   8) discharging waste gas from a waste gas outlet disposed on a side wall of the settler.

2. The method of claim 1, wherein the red mud is a waste product generated in an industrial production of aluminum through Bayer process; a mass percentage of total iron in the red mud is more than 20%.

3. The method of claim 1, wherein the method further comprises introducing nitrogen to the synthesis reactor prior to reaction.

4. The method of claim 1,
   wherein the method further comprises introducing nitrogen into the synthesis reactor for 20 to 60 minutes prior to reaction.

5. The method of claim 4, wherein a volume ratio of nitrogen to the hydrocarbon in the mixed gas is between 1:0.5 and 1:1.

6. The method of claim 4, wherein a flow rate of the mixed gas is between 0.2 and 0.5 m/s.

7. The method of claim 1, wherein the residual gases comprise an unreacted carbon source.

* * * * *